United States Patent Office 3,514,865
Patented June 2, 1970

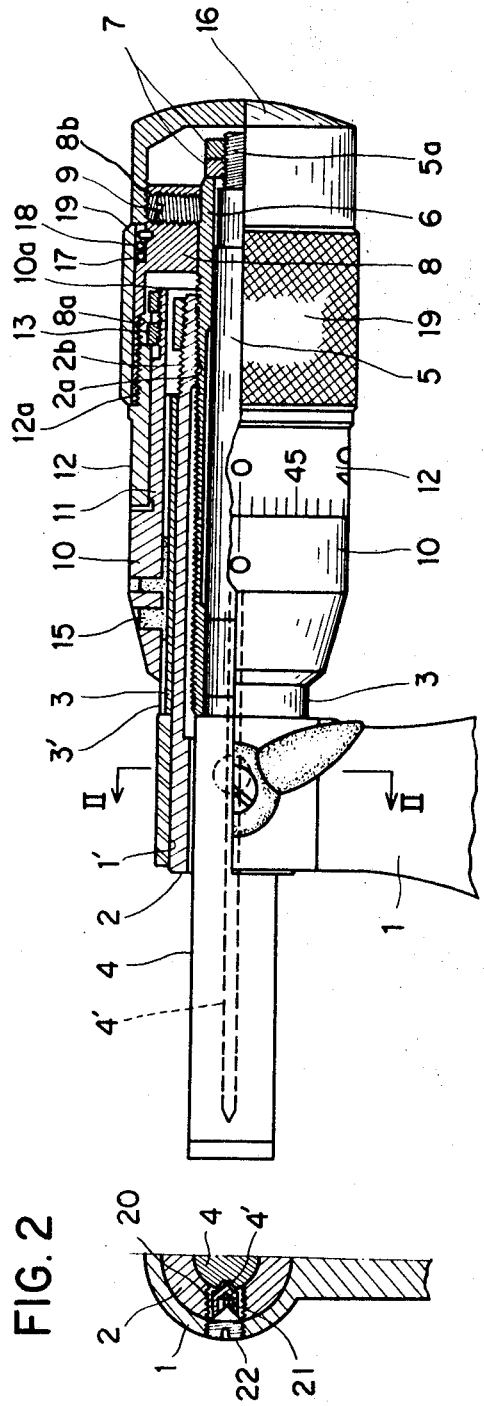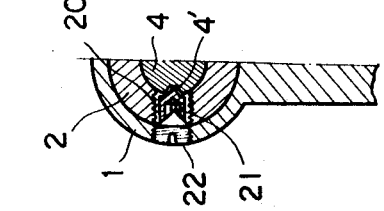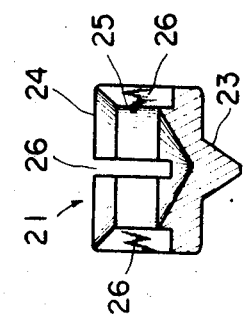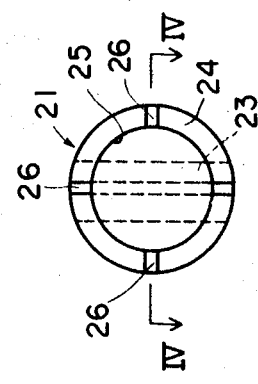

3,514,865
MICROMETER HAVING A NON-ROTATING SPINDLE
Yoshimitu Karahashi, Kawasaki, Japan, assignor to Yehan Numata, Yokohama, Japan
Filed May 31, 1968, Ser. No. 733,518
Claims priority, application Japan, July 15, 1967, 42/60,978
Int. Cl. G10b 3/22
U.S. Cl. 33—166    3 Claims

ABSTRACT OF THE DISCLOSURE

A micrometer having a non-rotating spindle and comprising an outer cylinder provided with an external axial guide groove and internal screw threads, a spindle extending through said cylinder and retained against rotational movement relative thereto, a tube rotatably mounted on said spindle and provided with external threads meshing with said internal threads, an axially slidable basic-scale tube guided by the guide groove in said cylinder, and a thimble-scale tube which rotates on said basic-scale tube and drives said spindle, with the scale-bearing surfaces of said thimble-scale tube and said basic-scale tube in alignment with each other.

---

The present invention relates to a micrometer in which the spindle moves axially but does not rotate.

The primary object of this invention is to provide a micrometer having a non-rotating spindle in which the thimble-scale and the basic-scale are in alignment with each other. The thimble-scale of a conventional micrometer is provided on the conical surface of the thimble, because the scale is read by the base-line of the outer cylinder. But this is not desirable, because a step is formed between the thimble and outer cylinder, thereby causing an error in the scale-reading. According to this invention, the outer cylinder is equipped with a basic-scale tube which can slide axially without rotating, and the thimble-scale tube connected to the spindle is rotatably engaged with the basic-scale tube, so that both the basic-scale and the thimble-scale can be read on the same plane.

Another object of this invention is to provide a micrometer equipped with a spindle that can move axially in either direction without rotation.

The conventional micrometer equipped with a non-rotating spindle has rotatable engagement between the screw and the stem of the spindle. In such construction a gap is likely to develop across this engagement, thereby lowering the accuracy of measurement. In this invention, the screw of the spindle is constructed as a threaded tube, into which the rear end of the spindle is inserted rotatably, while the spindle is so keyed to the frame as to be slidable in the axial direction without rotation. Therefore, there is no possibility of the spindle vibrating and the threaded tube can be "quenched" to harden it, thereby assuring good accuracy for a long period.

Still another object of this invention is to provide a non-rotating spindle micrometer which permits easy adjustment of the connection of the spindle to the threaded tube outside of the body. As the threaded tube is supported by a nut at the rear end of spindle and the spindle jaw, easy access is given to the nut by removing the cap at the rear end.

A fourth object of this invention is to provide a micrometer having a non-rottting spindle in which the spindle-guiding key comprises an elastic key ring and a screw, said elastic key ring being fitted into the key groove by means of the screw, with the result that the spindle can be guided very smoothly.

The details of the invention will be described with reference to the attached drawings, in which:

FIG. 1 shows an embodiment of this invention partly in elevation and partly in axial section;

FIG. 2 is a sectional view taken along the line II—II in FIG. 1;

FIG. 3 is a plan view of the spindle key ring, and

FIG. 4 is a sectional view taken along the line IV—IV in FIG. 3.

As best seen in FIG. 1, the frame 1 is provided with a hole 1', and the forward end of an inner cylinder 2 is fixed in that hole. The inner and outer cylindrical surfaces of the inner cylinder 2 are threaded near its rear end at 2a and 2b respectively. A longitudinally extending scale is provided on the outside of the inner cylinder 2, and an outer cylinder 3 provided with a longitudinally extending external groove 3' for guiding a vernier tube is fixed to the outside of the inner cylinder 2. The spindle 4 comprises an axially projecting shaft 5 of smaller diameter provided at its rear end with external screw threads 5a. The spindle 4 is also provided with a longitudinally extending guide groove 4' for receiving the key of a ring which will be hereinafter described.

The shaft 5 of the spindle 4 is encircled by an externally threaded tube 6 which is rotatable on but clamped against axial movement relative to the shaft 5 by means of nuts 7 screwed onto the externally threaded rear 5a end of the shaft 5. A thimble 8 is fastened to the rear end of the tube 6 by the set screw 9 and is provided with internal threading 8a at its front end and external threading 8b at its rear end. The tube 10 carrying the basic scale has a stepped portion 11 of lesser diameter and is provided at its rear end with external threads 10a. A thimble-scale tube 12 is rotatably mounted on the stepped portion 11 of the tube 10, and held against axial movement relative to the tube 10 by means of nuts 13 screwed onto the threads 10a at the rear end of the tube 10. The thimble 8 and thimble-scale tube 12 are screwed together to rotate as a unit.

A synthetic resin key 15 projects from the inner wall of the basic-scale tube 10 and this key fits into the guide groove 3' in the outer cylinder 3.

A cap 16 is screwed into the threaded part 8b of the thimble 8. The outer surface of the thimble 8 is provided with a groove 17, in which a coil spring 18 is seated, and said coil spring, together with the collar 19 which encircles the thimble 8, constitutes a constant friction pressure device.

A screw hole 20 (FIG. 2) extends through the frame 1 and through the wall of the inner cylinder 2 into the bore in said cylinder. With the hole 20 aligned with the guide groove 4' of the spindle 4, the key ring 21 is inserted through the screw hole 20 into the guide groove 4'; and screw 22 with a conical tip is screwed in with pressure on top of the key ring 21.

As shown in FIGS. 3 and 4, the key ring 21 as a whole looks like a cup with a projecting ridge 23 at the bottom and a conical recess 24 at its top, and several grooves 26, 26 in the cylindrical part 25 extending axially down from its top, thereby making the key ring elastic.

In operation, rotation of the thimble collar 19 causes simultaneous rotation of the thimble 8, the thimble-scale tube 12 and the tube 6 and in consequence, the basic-scale tube 10 moves in the guide groove 3' of the outer cylinder 3 and the spindle 4 moves in the inner cylinder 2, guided by the key ring 21.

In measurement there is no error in the reading, because both the thimble-scale and the basic-scale are on aligned surfaces. Moreover, by unfastening the rear end cap the nuts 7 holding the tube 6 can be adjusted.

In reading the scale, you read higher digits on the scale of the outer cylinder 3 and read fractions thereof from the thimble-scale and the basic-scale tube.

What is claimed is:

1. A micrometer having a non-rotating spindle and comprising a cylinder provided with an external axial guide groove and internal screw-threads, said spindle being slidably mounted in said cylinder but restrained against rotation therein, a threaded tube meshing with said internal screw threads and rotatably mounted on said spindle, a basic-scale tube encircling and slidably mounted on said cylinder and provided with guide means slidable in the guide groove of said cylinder, and a thimble scale tube rotatably mounted on said basic-scale tube and connected to cause axial movement of said spindle by rotating said threaded tube in said internal screw-threads, the external surfaces of said thimble-scale tube and said basic-scale tube being in alignment with each other.

2. A micrometer as claimed in claim 1, in which said spindle comprises a portion of smaller diameter at the rear end thereof which extends through the threaded tube and which is retained by nuts at the rearmost end thereof, said cylinder being rotatably fitted to said portion of smaller diameter of said spindle.

3. A micrometer as claimed in claim 1, in which the spindle is prevented from rotating in said cylinder by an elastic key ring urged into a groove in said spindle by a pressure screw.

References Cited

UNITED STATES PATENTS

| 2,900,731 | 8/1959 | Meyer | 33—166 |
| 2,963,792 | 12/1960 | Roch | 33—166 X |

FOREIGN PATENTS

| 1,147,731 | 6/1957 | France. |

WILLIAM D. MARTIN, JR., Primary Examiner